Oct. 24, 1939.                W. R. WHITFIELD                2,177,194
                    AUTOMATICALLY CONTROLLED VENTILATOR
                           Filed Oct. 17, 1936
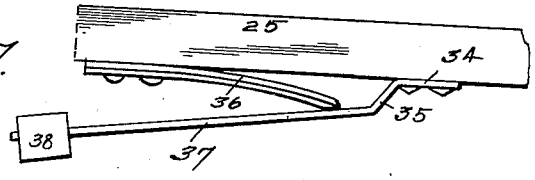
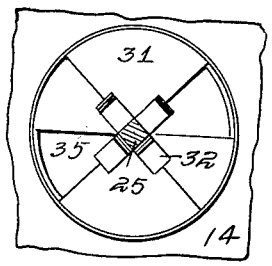
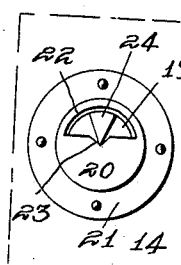
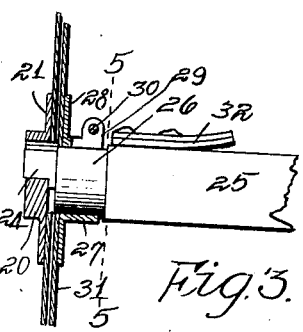
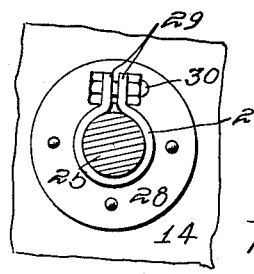
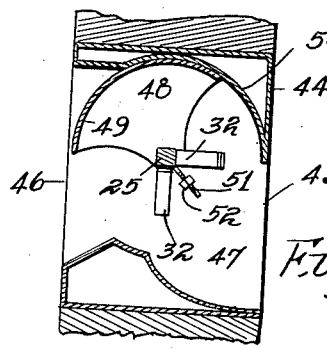
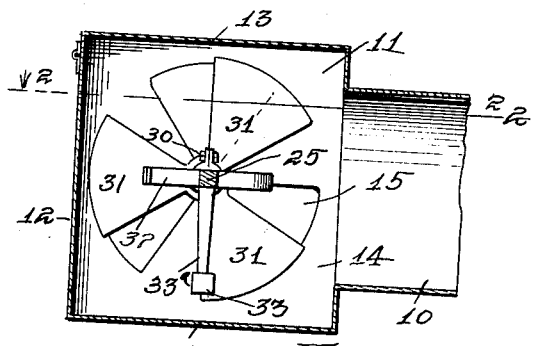
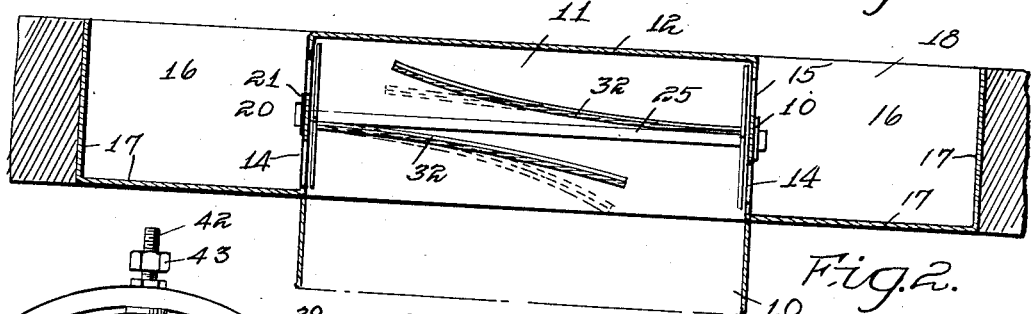
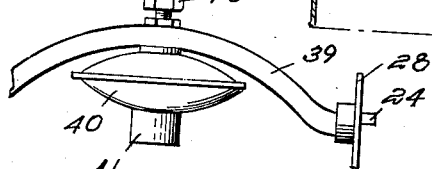
Inventor
William R. Whitfield.
by Orwig & Hague Attys Patented Oct. 24, 1939

2,177,194

UNITED STATES PATENT OFFICE 2,177,194

AUTOMATICALLY CONTROLLED VENTILATOR

William Russell Whitfield, Ames, Iowa

Application October 17, 1936, Serial No. 106,132

7 Claims. (Cl. 236—49)

The object of my invention is to provide an improved ventilator device adapted to be used in connection with various ventilation systems such as are used in the ventilation of large and small buildings, heating systems, window ventilators, etc., and employing one or more valves or dampers for controlling the flow of air through the ventilator pipes wherein it is desired to control the valve by temperature variations.
More specifically, it is the object of my invention to so construct the ventilating system in which my device is to be used that preferably a plurality of valve devices may be mounted on a horizontal rock shaft to produce a balanced valve effect to guard against opening and closing of the valves due to air currents entering and leaving the air duct or passage controlled by the valves, and also support on the rock shaft a thermostat having a member free to move toward and from the center of the shaft to thereby change the center of gravity of the valves and the thermostatic device carried thereby, to cause the valve to be moved to open or closed position whereby the valve may be supported in a predetermined open or closed position when the air flowing through the ventilating system is at a desired temperature, wherein any movement of the thermostatic element will cause the valves to be moved to open or closed position.

My invention consists in the construction, arrangement and combination of the various parts of the device whereby the objects contemplated are attained, as hereinafter more fully set forth, pointed out in my claims, and illustrated in the accompanying drawing, in which:

Figure 1 illustrates a ventilating pipe embodying my invention and showing the manner in which the thermostatic control valve is mounted therein.

Figure 2 is a detail sectional view taken on the line 2—2 of Figure 1.

Figure 3 is an enlarged detail sectional view illustrating the bearing for supporting the valve mechanism and the manner in which the valve is mounted on said shaft.

Figure 4 is a detail end elevation of the valve supporting bearing.

Figure 5 is a detail sectional view taken on the line 5—5 of Figure 3.

Figure 6 is a modified valve arrangement in which four sets of thermostats are employed, instead of two as illustrated in Figure 1.

Figure 7 is a modified form of one of the thermostat elements.

Figure 8 is a sectional view of the modified form of ventilator and valve arrangement wherein a single valve is used instead of a plurality of valves.

Figure 9 illustrates a further modified form of thermostat and the manner in which the same is mounted on the valve supporting shaft.

In the drawing I have used the reference numeral 10 to indicate a ventilator pipe having a head member 11 at one end, said head member comprising a casing having a back member 12, top and bottom members 13 and partition members 14, said partition members 14 being provided with openings 15, said openings communicating with chambers 16 formed by the casing walls 17, the casing 17 having outlet openings 18. Each of the partitions 14 is provided with an opening 19. Adjacent to each of the openings 19 is a bearing plate 20 having a flange 21 by means of which the bearing is supported on the members 14. The bearing 20 is provided with a semi-circular opening 22 having a notch 23 to form a bearing for supporting a knife edge 24 formed on each end of a rock shaft 25.

By this arrangement it will be seen that the shaft 25 has its ends supported in the bearings 20 and extends longitudinally through the center of the head 11. Each end of the shaft 25 is provided with a cylindrical portion 26 for receiving a collar 27, including a disc 28, said collar being split and provided with outwardly extending flanges 29 through which a bolt 30 extends, providing means whereby the collar 27 may be rotated about the cylindrical portion 26 and locked in any desired position by tightening the nut on the bolt 30.

Fixed to each of the discs 28 is a set of valves 31 adapted to co-operate with the openings 15 to open and close said openings as the shaft 25 is rocked.

Supported on each end of the shaft 25 I have provided a thermostatic strip 32, each strip being formed of two strips of metal, one having a high co-efficient of expansion while the other is of low co-efficient of expansion, so that the free ends of the strips 32 will be warped toward and from the shaft 25 due to temperature changes. These thermostatic strips are of the usual construction. They are so mounted, however, that the strips are inclined relative to the shaft in the manner clearly illustrated in Figure 2, and so arranged that as the free end of one of the strips is warped away from the shaft 25, the free end of the other strip will be warped toward said shaft, as illustrated in dotted lines. thus shifting the weight of one of the strips towards the shaft and the weight of the other strip away from the shaft so as to produce an unbalanced condition, which in turn will cause the shaft 25 to be rocked and the valves 31 to be moved relative to the openings 15, to open or close said openings, depending on the direction of movement of the shaft 25. The shaft 25 is provided with a downwardly extending arm 33a having a weight 33 on its lower end, which always tends to move the shaft 25 to its normal position and the valves to semi-closed or open position or to the position in which the valves are designed to be set at a pre-determined normal temperature, the adjustment of the valves being accomplished by means of the collars 27 and the adjusting bolts 30.

The thermostats are preferably supported in a horizontal plane, as illustrated in Figure 1, when the valves are in said normal positions. By this arrangement it will be seen that if the temperature is increased, the free ends of the members 32 will be warped in one direction, causing the valves 31 to rotate in a corresponding direction, or if the temperature is decreased, the free ends of the members 32 will be warped in the opposite direction, tending to reverse the movement of the valves 31. By this arrangement air may enter the pipe 10 and into the head 11 and there be divided to flow in opposite directions through the openings 15 to the chambers 16.

By this arrangement it will be seen that a balanced condition will be established between the two sets of valves so as to relieve the shaft 25 of any longitudinal pressures. The knife edge bearings 24 serve to produce anti-friction bearings whereby the members 32 and 25 may be easily operated. By fixing the members 32 to the shaft 25 and warping their free ends toward or from said shaft, I have provided means whereby a balanced or unbalanced condition may be automatically set up to move the valves to a normal position or to either an open or closed position without the use of any other complicated mechanism.

Sometimes it is desired to increase the sensitivity of the device, which may be accomplished by an arrangement somewhat as illustrated in Figure 7 in which a lever arm 34, formed of spring metal and having one end riveted to one side of the shaft 25, the arm being bent outwardly at the point 35 and provided with a portion 37 supported substantially parallel with the shaft 25 and having its free end provided with a weight 38, the free end of a thermostatic strip 36 engaging the inner surface of the member 37 so that as the free end of the strip 36 is warped outwardly it will cause the free end of the member 37 to be moved outwardly and the movement of the weight 38 amplified relative to the movement of the free end of the member 36, thus providing means whereby the sensitivity of the device may be increased.

The shaft 25 may be provided with four thermostatic strips 32 as illustrated in Figure 6, instead of two, if so desired. By this arrangement the shaft 25 may be rocked to a greater number of degrees than would be possible if only two thermostatic strips were provided, the pair of strips approaching the horizontal plane becoming active as far as operating the shaft is concerned, while the strips approaching the vertical plane become inactive due to the fact that both of said strips would then fall in a common vertical plane.

In Figure 9 I have illustrated a slightly modified form of thermostat in which a curved shaft 39 is substituted for the shaft 25, a thermostatic wafer 40 being substituted for the strips 32 and placed on the concave side of the shaft 39. A weight 41 may be mounted on one side of the wafer 40, while a shaft 42 is projected laterally from the convex side of the member 39, said shaft being screw-threaded and provided with an adjusting nut 43 for balancing the shaft 39, the shaft 39 being provided with a disc 28 in the same manner as provided on the shaft 25. By this arrangement it will be seen that expansion and contraction of the wafer 40 will cause the weight 41 to be moved toward and from the pivotal center of the shaft 39 and the shaft rocked in the manner before described.

In Figure 8 I have illustrated another modified form of my device in which a casing 44 is provided having an inlet opening 45 and an outlet opening 46, the shaft 25 being mounted in the end members 47 in the manner above described, said shaft being provided at each end with plates 48 carrying a valve 49, said valve being curved to fit the curved surface 50 of the casing 44 and adapted to close the opening 46 when in one position of its movement. By this arrangement I have provided on the shaft 25 a pair of thermostatic strips 32 placed in planes at right angles to each other and on the opposite side from the member 49. A screw-threaded shaft 51 is provided with a balancing nut 52.

From the foregoing it will readily be seen that I have provided a ventilating device including a ventilator pipe having one or a number of inlet or outlet openings, and in connection with the openings, valves carried by a horizontal shaft and capable of being placed in balanced condition, and in connection therewith a thermostat having a movable member caused to move toward and from the shaft due to temperature variations for upsetting the balanced condition of the shaft and the members carried thereby, whereby the valves may be moved to open and close said inlet and outlet openings. It will further be seen that various modifications of this general idea may be carried out to meet the various working conditions that would be encountered by the application of my improved ventilator. It will further be seen that the device is very sensitive and capable of being adjusted to meet the various working conditions and that all linkage devices are eliminated, such as are now in common use in connection with thermostatically controlled valves for ventilators, and which in turn increases the sensitivity of the devices and at the same time greatly reduces the cost of construction and eliminates the necessity of attention and repairs.

I claim as my invention:

1. A ventilator comprising a casing having one end open, ventilation openings in opposite and parallel sides of said casing, a shaft between and perpendicular to said sides, and valves carried by said shaft for opening and closing said openings as the shaft is rocked, and a thermostatic device carried by said shaft having a member adapted to be moved toward and from said shaft due to temperature variations, whereby the center of gravity of the weight of the members carried by said shaft may be varied and the shaft rocked to accomplish opening and closing movements of said valves.

2. A ventilator comprising a casing having one end open, ventilation openings in opposite and parallel sides of said casing, a shaft between said sides, and valves carried by said shaft for opening and closing said openings as the shaft is rocked, and a thermostatic device carried by said shaft having a member adapted to be moved toward and from said shaft due to temperature variations, whereby the center of gravity of the weight of the members carried by said shaft may be varied and the shaft rocked to accomplish opening and closing movements of said valves.

3. A ventilator casing having an opening, a substantially horizontal shaft pivotally mounted in said casing, a valve carried by said shaft for closing said opening as the shaft is rocked in one direction, a bimetallic thermostatic strip having one end parallel and fixed to said shaft and the other inclined outwardly therefrom and adapted to move toward and from said shaft in response to temperature variations, to change the center of gravity of said valve and thermostat, and means for automatically and gradually counter-balancing the shifting of said center of gravity to limit and stabilize the movement of said valve whereby the valve may be gradually moved to open or closed positions.

4. A ventilator, comprising a casing having a ventilation opening, a pivotally mounted horizontal shaft, a valve carried by said shaft supported to open and close said opening as the shaft is rocked, a thermostatic device carried by each of two opposite sides of said shaft, each having a member adapted to move toward and from the shaft due to temperature variations, one being designed to move toward the shaft and the other one to move simultaneously away from the shaft, or vice versa, the valve and thermostatic devices being normally supported in a balanced condition with the movable members to operate in substantially a horizontal plane whereby movement of the movable members on the thermostatic device will operate in unison to change the center of gravity of said device and to cause the shaft to be gradually rocked and the valve moved to open or close said opening.

5. A ventilator, comprising a casing having a ventilation opening, a pivotally mounted horizontal shaft, a valve carried by said shaft supported to open and close said opening as the shaft is rocked, a thermostatic device carried by each of two opposite sides of said shaft, each having a member adapted to move toward and from the shaft due to temperature variations, one being designed to move toward the shaft and the other one to move simultaneously away from the shaft, or vice versa, the valve and thermostatic device being normally supported in a balanced condition with movable members to operate in substantially a horizontal plane whereby movement of the movable members on the thermostatic device will operate in unison to change the center of gravity of said device and to cause the shaft to be gradually rocked and the valve moved to open or close said opening, and means for automatically and gradually counter-balancing the shifting of said center of gravity to limit and stabilize the movement of said valve whereby the valve may be gradually moved to open or closed positions.

6. A ventilator casing having an opening, a valve supported to rotate about a horizontal axis for opening and closing said opening as the valve is rocked, a thermostatic device mounted to rotate in unison with the valve as the valve is rocked, and having a movable weight element controlled by temperature variations to move toward and from the said axis of rotation, the valve and thermostat being supported in a balanced condition with the movable element to move in a substantially horizontal plane at a predetermined temperature whereby the valve will be rocked as the temperature-controlled weight is moved toward or from said axis of rotation, and means for automatically and gradually counterbalancing the shifting of said movable weight element to limit and stabilize said movement whereby the valve may be gradually moved to open or closed positions.

7. A ventilator casing having a ventilation opening, a valve supported to rotate about a horizontal axis for opening and closing said opening as the valve is rocked, a pair of thermostatic devices supported substantially in a common horizontal plane and on diametrical opposite sides of the axis of rotation, each device having a member adapted to move toward and from said axis of rotation due to temperature variations, one being designed to move toward said axis and the other to move simultaneously away therefrom, or vice versa, the valve and thermostatic devices being normally supported in a balanced condition with the movable members to operate in substantially a horizontal plane whereby the movement of said movable members will operate in unison to change the center of gravity of said device and to cause the shaft to be gradually rocked and the valve moved to open or close said opening.

WM. RUSSELL WHITFIELD.